Patented Aug. 12, 1952

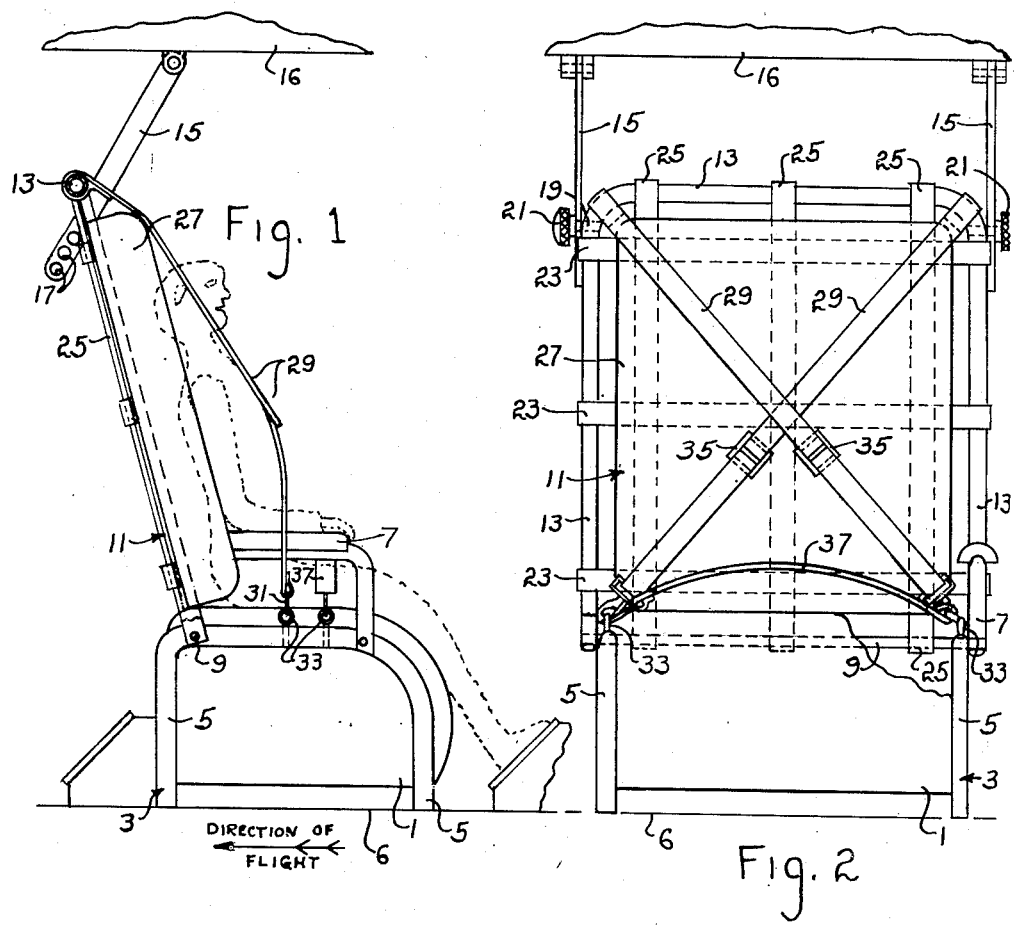
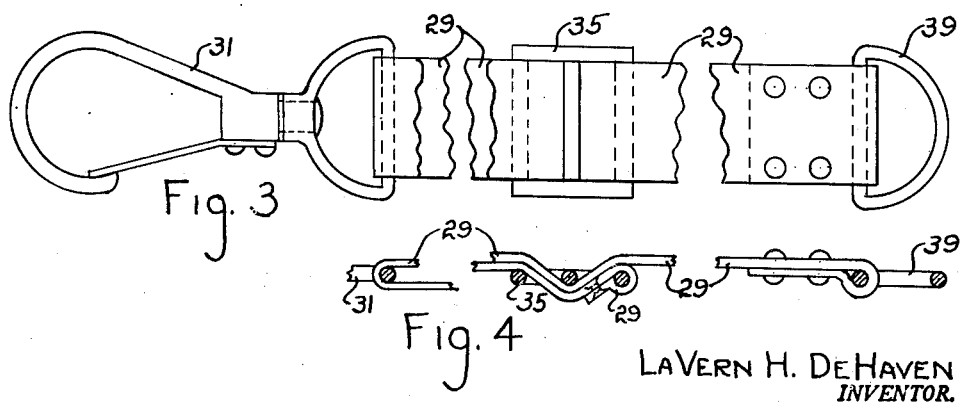

2,606,727

UNITED STATES PATENT OFFICE 2,606,727

SAFETY CHAIR FOR VEHICLES

La Vern H. De Haven, Allen County, Ind.

Application July 30, 1947, Serial No. 764,667

10 Claims. (Cl. 244—118)

This invention relates to a safety chair or seat for commercial vehicles; more specifically, to a chair for commercial air and land vehicles which will minimize the danger to an occupant in the event of a collision or crash.

In the conventional air or land vehicle, hereinafter referred to as a vehicle, a crash results in the occupants being thrown forward with great force against rigid structural members of the vehicle, frequently inflicting serious injury or death to one or more of the occupants.

It is an object of this invention to cushion the occupant in the normal direction of motion and to distribute the bodily contact over a greater area. The inventor has therefore provided a seat in which the occupant sits facing the rear of the vehicle so that he rides backwards and a resilient back on the seat evenly distributes any shock due to sudden deceleration over a great area of the body. At the same time, the seat provides firm support for the head and limbs. By this means it is believed to be possible to decrease the number of serious injuries and fatalities due to collisions and crashes and thus add immeasurably to the safety of traveling.

It is therefore an object of this invention to provide a safety chair for air and land vehicles.

It is another object of this invention to provide a safety seat for air and land vehicles which will cushion the occupant in a crash.

It is still another object of this invention to provide a safety seat for air and land vehicles which will distribute the forces created by sudden deceleration over a large area of the occupant's body.

It is still another object of this invention to provide a safety seat for air and land vehicles which will provide firm support for the limbs and head of the occupant.

It is still another object of this invention to provide a safety seat for air and land vehicles having means which will prevent the occupant from being thrown therefrom and provide a cushion to absorb any shock due to deceleration of the vehicle.

These and other objects will be apparent upon consideration of this specification and the drawings which are attached hereto and made a part hereof and in which:

Figure 1 is a side elevation of the safety chair with some parts removed to show the construction of the back.

Figure 2 is a front elevation of the chair showing the safety straps.

Figures 3 and 4 are detailed views of the safety straps showing the length adjustment and the snap fastener.

Referring to Figures 1 and 2 of the drawings, the numeral 1 designates the seat proper which is supported by a metal frame 3 having two side members 5 of bent tubing or other material. The frame is preferably fastened to the floor 6 of the vehicle. Arm rests 7 rise from the framework on either side of the seat. A bar 9 extends between the side members 5 at the rear and forms a part of the back 11.

A piece of tubing 13 formed into an inverted U is pivoted on the bar 9 and serves as a frame for the back. The supports 15 are pivotally fastened to the roof 16 of the vehicle and have holes 17 at the opposite ends which slip over studs 19 projecting from the sides of the tubing 13 near the top. A hand nut 21 retains the supports in place.

The series of holes 17 provide for changing the angle of inclination of the back about the pivot.

Horizontal web members 23 have their ends fastened to both of the vertical members of the tubing 13 and vertical web members 25, interlaced with the horizontal webbing, have their ends fastened to the cross member of the tubing 13 and the bar 9 to form a two-directional and resilient support grid for the back cushion 27. The back cushion is preferably made of a thick pad of airfoam rubber fastened to the webbing by any suitable means.

Safety straps 29, intended for use particularly in aircraft, are fastened to the tubing 13 at the radii, joining the vertical and horizontal portions thereof, and extend diagonally across the front of the back cushion. Snaps 31 are attached to the other ends of the straps and engage rings 33, which are secured to the top sides of the frame members 5. These straps extend over the chest of the passenger and prevent him from being thrown away from the back cushion. An adjustable fitting 35 provides for lengthening and shortening the straps to accommodate various sizes of passengers.

Another safety strap 37 is fastened by a half ring 39 to one of the rings 33 and has a snap 31 at the other end to engage the ring 33 on the opposite member 5. This strap passes over the legs of the passenger as shown in Figure 1 and prevents the passenger's legs flying up should the vehicle nose over. The safety strap 37 may or may not have an adjustment fitting 35.

Operation

The passenger, in a vehicle having seats constructed and arranged as disclosed above, would ride facing the rear of the vehicle. In both air and land vehicles the majority of serious injuries and fatalities result from a head-on crash with the earth or with some other object, which abruptly decelerates the vehicle throwing the passengers out of their seats and forward with great force. Safety straps have been long used in aircraft, but they provide only a localized support which frequently is the direct cause of death, particularly those resulting in internal injuries and a broken neck.

The safety straps as employed in this invention merely hold the passenger in the seat and the resilient back cushion and webbing distribute the shock load over the entire back of the passenger and, at the same time, support the limbs and head of the passenger.

In the event the vehicle noses over, the greatest deceleration has already taken place in the initial impact prior to nosing over and has been absorbed by the cushion and webbing, the safety straps preventing the passenger from being thrown from the seat in the nose over.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a safety chair for vehicles, a seat mounted to face the rear of said vehicle and fixed to the floor thereof, a rectangular framework rising from the rear of said seat, and resilient webbing and an airfoam cushion mounted on said framework and within said rectangle to support and cushion the body and head of an occupant from any shock due to sudden deceleration of the forward motion of the vehicle.

2. In a vehicle having a floor, a seat mounted to face the rear of said vehicle and fixed to the floor thereof, a rectangular framework rising from the rear of said seat, resilient webbing and an airfoam cushion mounted on said framework and within said rectangle to support and cushion the body and head of an occupant from any shock due to sudden deceleration of the forward motion of the vehicle, and safety straps for securing the occupant in said seat.

3. In a vehicle having a floor, a seat mounted to face the rear of said vehicle and fixed to the floor thereof, a back pivotally mounted at the bottom to the rear of the seat and adjustably anchored at the top to the roof of the vehicle, and resilient webbing and an airfoam cushion on said back adapted to distribute the shock load resulting from any sudden deceleration of the forward motion of the vehicle over the body and head of the occupant of said chair.

4. In a vehicle having a normal forward direction of motion and a floor, seats in said vehicle, each seat comprising a seat frame fixed to the floor, an open back frame attached to the seat frame, web members attached to the back frame and crossed to form a grid, a back cushion attached to the members and a seat cushion fixed to the seat frame, said back frame being attached to the seat frame adjacent the forward edge thereof.

5. In a vehicle having a normal forward direction of motion, a roof and a floor, seats in said vehicle, each seat comprising a seat frame fixed to the floor, an open back frame attached to the seat frame, means connecting the upper part of the back frame with the roof, web members attached to the back frame and crossed to form a grid, a back cushion attached to the members and a seat cushion fixed to the seat frame, said back frame being attached to the seat frame adjacent the forward edge thereof.

6. In a vehicle having a normal forward direction of motion and a floor, seats in said vehicle, each seat comprising a seat frame fixed to the floor, an open back frame attached to the seat frame, resilient web members attached to the back frame and crossed to form a grid, a back cushion attached to the members and a seat cushion fixed to the seat frame, said back frame being attached to the seat frame adjacent the forward edge thereof.

7. In a vehicle having a normal forward direction of motion and a floor, seats in said vehicle, each seat comprising a seat frame fixed to the floor, an open back frame attached to the seat frame, resilient web members attached to the back frame and crossed to form a grid, a back cushion attached to the members but fitting within said open back frame whereby forward displacement of the back cushion is limited only by the web members, and a seat cushion fixed to the seat frame, said back frame being attached to the seat frame adjacent the forward edge thereof.

8. In a vehicle having a normal forward direction of motion, a roof and a floor, seats in said vehicle, each seat comprising a seat frame fixed to the floor, an open back frame attached to the seat frame, adjustable means connecting the upper part of the back frame with the roof, web members attached to the back frame and crossed to form a grid, a back cushion attached to the members and a seat cushion fixed to the seat frame, said back frame being pivotally attached to the seat frame adjacent the forward edge thereof.

9. In a vehicle having a normal forward direction of motion and a floor, seats in said vehicle, each seat comprising a seat frame fixed to the floor, an open back frame attached to the seat frame, web members attached to the back frame and crossed to form a grid, a back cushion attached to the members, a seat cushion fixed to the seat frame, said back frame being attached to the seat frame adjacent the forward edge thereof, and safety straps having their opposite ends fixed respectively to the back and seat frames and disposed to be crossed to support the torso of an occupant.

10. In a vehicle having a normal forward direction of motion and a floor, seats in said vehicle, each seat comprising a seat frame fixed to the floor, an open back frame attached to the seat frame, web members attached to the back frame and crossed to form a grid, a back cushion attached to the members, a seat cushion fixed to the seat frame, said back frame being attached to the seat frame adjacent the forward edge thereof, and a safety strap fixed at opposite ends to opposite sides of the seat frame and disposed to cross the lap of an occupant.

LA VERN H. DE HAVEN.

REFERENCES CITED

The following references are of record in the file of this patent:

UNITED STATES PATENTS

| Number | Name | Date |
|---|---|---|
| 400,066 | Enequist | Mar. 26, 1889 |
| 997,704 | Rodden | July 11, 1911 |
| 1,807,939 | Sikorsky | June 2, 1931 |
| 1,827,928 | Berger | Oct. 20, 1931 |
| 2,227,717 | Jones | Jan. 7, 1941 |
| 2,346,895 | Bergman | Apr. 18, 1944 |
| 2,463,330 | Stretch | Mar. 1, 1949 |

FOREIGN PATENTS

| Number | Country | Date |
|---|---|---|
| 590,457 | France | June 17, 1925 |
| 335,690 | Germany | Apr. 11, 1921 |

OTHER REFERENCES

Publication: "Aviation News," issue of November 18, 1946, page 41.